US007356510B2

United States Patent
Durand et al.

(10) Patent No.: US 7,356,510 B2
(45) Date of Patent: Apr. 8, 2008

(54) CONTENT DELIVERY

(75) Inventors: Julian Durand, Cambridge, MA (US); Tommy Arnberg, Espoo (FI)

(73) Assignee: Nokia Corporation, Espoo (FI)

( * ) Notice: Subject to any disclaimer, the term of this patent is extended or adjusted under 35 U.S.C. 154(b) by 676 days.

(21) Appl. No.: 10/134,372

(22) Filed: Apr. 30, 2002

(65) Prior Publication Data
US 2003/0023578 A1 Jan. 30, 2003

Related U.S. Application Data

(60) Provisional application No. 60/287,015, filed on Apr. 30, 2001.

(51) Int. Cl.
*G06Q 99/00* (2006.01)
*H04K 1/00* (2006.01)
*H04L 9/00* (2006.01)

(52) U.S. Cl. .......................... 705/51; 705/50
(58) Field of Classification Search ............... 705/26, 705/50, 51
See application file for complete search history.

(56) References Cited

U.S. PATENT DOCUMENTS

| | | | | | |
|---|---|---|---|---|---|
| 5,191,573 | A | * | 3/1993 | Hair | 369/84 |
| 5,892,900 | A | * | 4/1999 | Ginter et al. | 726/26 |
| 5,905,719 | A | * | 5/1999 | Arnold et al. | 370/330 |
| 6,006,332 | A | * | 12/1999 | Rabne et al. | 713/201 |
| 6,151,631 | A | * | 11/2000 | Ansell et al. | 709/229 |
| 6,332,127 | B1 | | 12/2001 | Bandera et al. | |
| 6,510,417 | B1 | | 1/2003 | Woods et al. | |
| 6,609,090 | B1 | * | 8/2003 | Hickman et al. | 704/9 |
| 6,615,186 | B1 | | 9/2003 | Kolls | |
| 6,718,328 | B1 | * | 4/2004 | Norris | 707/9 |
| 6,792,280 | B1 | * | 9/2004 | Hori et al. | 455/517 |
| 6,859,791 | B1 | * | 2/2005 | Spagna et al. | 705/51 |

FOREIGN PATENT DOCUMENTS

| | | |
|---|---|---|
| EP | 853287 | 7/1998 |
| EP | 1077437 | 2/2001 |
| JP | 11-55726 A | 6/1989 |
| JP | 2000-152310 A | 5/2000 |
| JP | 2001078266 A * | 3/2001 |
| WO | 9951038 | 10/1999 |
| WO | 9955102 | 10/1999 |
| WO | WO00/62265 | 10/2000 |

OTHER PUBLICATIONS

"IP address", www.wikipedia.com.*
"Boxman,, Motorola pact on service", Kai R. Lofthus, Billboard, 2-19-200, v112, 18, p. 50.*

* cited by examiner

*Primary Examiner*—Calvin Loyd Hewitt, II
(74) *Attorney, Agent, or Firm*—Banner & Witcoff, Ltd.

(57) ABSTRACT

A system for delivering content to a terminal includes a secure content server. The server includes a database in which content delivery conditions are defined. At least one of the delivery conditions relates to a location at which it is permissible to render content. A request from a terminal to deliver content for rendering will be accepted provided the terminal is determined to be within the pre-defined location.

37 Claims, 2 Drawing Sheets

CONTENT DELIVERY

CROSS REFERENCE TO RELATED APPLICATIONS

The present application claims the benefit of priority of U.S. Provisional Application No. 60/287,015, filed Apr. 30, 2001 the contents of which is incorporated herein by reference.

BACKGROUND OF THE INVENTION

The present invention relates to the delivery of content, particularly, although not exclusively, to mobile terminals.

Traditionally, the distribution of content, whether it is audio, video, textual or similar matter has been controlled by the right holder. Thus, a right holder has been able to release content in a format and at a time of their choice. In addition, the right holder has been able to license the distribution of content through collecting societies and the like particularly in relation to public performance of content such as audio and visual works. A license to permit such performances is typically made available through a collection society or body which collectively negotiates license terms on behalf of its members, the right holders. Such licenses may restrict the time, location and other conditions under which the content is made available.

In addition to the market conditions which may influence the release of content, the right holder may also have to comply with local legislation dictating the availability of content to users. For example, content may be made available to a user only above a certain age. More recently, right holders have had to adapt to new forms of distribution such as digital media in the form of compact discs (CDs), digital versatile discs (DVDs) as well the possibility of distribution over networks such as the Internet. Some efforts have been made to maintain the ability of the right holder to control the distribution of content and include the concept of regional coding applied to DVDs, for example. As a result of such coding, a DVD may be rendered by a compliant player only, that is a player having a corresponding regional code.

SUMMARY OF THE INVENTION

Thus, according to one aspect of the invention, there is provided a content delivery system for securely rendering content on a terminal, the system comprising a mobile terminal operable to establish a connection to a network and request delivery of content from a secure content server, said network being operable to determine the location of said terminal and provide access to said secure content server, the server being operable to associate said content identified in said request with at least one delivery condition stored on a database, a said at least one delivery condition defining a rendering location, the server being further operable to obtain the location of the terminal from said network such that where said terminal location corresponds to said rendering location content is delivered to said terminal.

In addition to allowing the right holder to control the distribution of digital content in a manner that has become customary, an audit server may integrated with the system such that access to the content may be monitored. Although content may be rendered by the terminal itself, it would be possible to deliver content to a standalone rendering machine provided the server could be assured that the machine is both authenticated and located within an area meeting the delivery condition. Advantageously, the system allows for differentiation of delivery conditions such that content may be stored centrally but access to that content via a network is controlled to meet local legislative requirements, thus the content provider is able to make content available digitally relying on local controls within secure servers on networks to which terminals have access.

According to another aspect of the invention, there is provided a content delivery system for securely rendering content on a terminal, the system comprising a mobile terminal operable to determine its location and to establish a connection to an access point in order to request delivery of content from a secure content server, said access point being operable to provide access to said secure content server, the server being operable to associate said content identified in said request with at least one delivery condition stored on a database, a said at least one delivery condition defining a rendering location, the server being further operable to obtain the location of the terminal from said access point such that where said terminal location corresponds to said rendering location content is delivered to said terminal.

Conveniently, the terminal includes a positioning system such as GPS, the output of which is trusted. Consequently, there is no need for the network operator to provide location-determining capability. Such a system may find favor in those networks where terminal positioning is already a requirement. According to a further aspect of the invention, there is provided a content delivery system for securely rendering content on a terminal, the system comprising a mobile terminal operable to determine its location and to establish a connection to an access point in order to request delivery of content from a secure content server, said access point being operable to provide access to said secure content server, the server being operable to associate said content identified in said request with at least one delivery condition stored on a database, a said at least one delivery condition defining a rendering location, the server being further operable to obtain the location of the terminal from said access point such that where said terminal location corresponds to said rendering location content is delivered to said terminal.

Advantageously, the system may be scaled to meet the requirements of different networks, thus an access point may be provided by a base station of a public land mobile network (PLMN), a Local Area Network (LAN), a Wireless Local Area Network, or even a point to point connection utilizing Low Power Radio Frequency or Infrared, for example. Clearly, the delivery route for the content need not be the same as that used to request the content. Thus, a terminal may need to operate in a number of communication modes.

According to yet another aspect of the invention, there is provided a content delivery system for securely rendering content on a terminal, the system comprising a mobile terminal operable to determine its location and to establish a connection to an access point in order to request delivery of content from a secure content server, said access point being operable to provide access to said secure content server, the server being operable to associate said content identified in said request with at least one delivery condition stored on a database, a said at least one delivery condition defining a rendering location, the server being further operable to obtain the location of the terminal from said terminal such that where said terminal location corresponds to said rendering location content is delivered to said terminal.

According to a still further aspect of the invention, there is provided a secure content server including a database having stored thereon at least one delivery condition associated with content, the server being operable in response to a request for content from a terminal to determine from said database a said at least one delivery condition defining a rendering location of said content, the server being further operable to obtain the location of the terminal such that where said terminal location corresponds to said rendering location said content is delivered to said terminal.

The server may from part of a network architecture through via which the content is delivered to the terminal, in which case the delivery conditions may be set, at least in part, by the network operator to meet with local legislative requirements regarding accessibility to content. Advantageously, such a server could form part of a private network such as an intranet, whereby content is available for rendering only within areas defined by the intranet operator. Thus, an organization may restrict the availability of content such as text, charts, sounds, music and other data to its premises.

According to a another aspect of the invention, there is provided a content delivery method for securely rendering content on a terminal, the method comprising receiving a request from a terminal for delivery of content, associating said content identified in said request with at least one delivery condition stored on a database, a said at least one delivery condition defining a rendering location, obtaining the location of the terminal and delivering said content to said terminal where said terminal location corresponds to said rendering location.

BRIEF DESCRIPTION OF THE DRAWINGS

In order to understand the present invention more fully, a number of embodiments thereof will now be described by way of example and with reference to the accompanying drawings, in which.

DETAILED DESCRIPTION OF THE INVENTION

Figure 1:
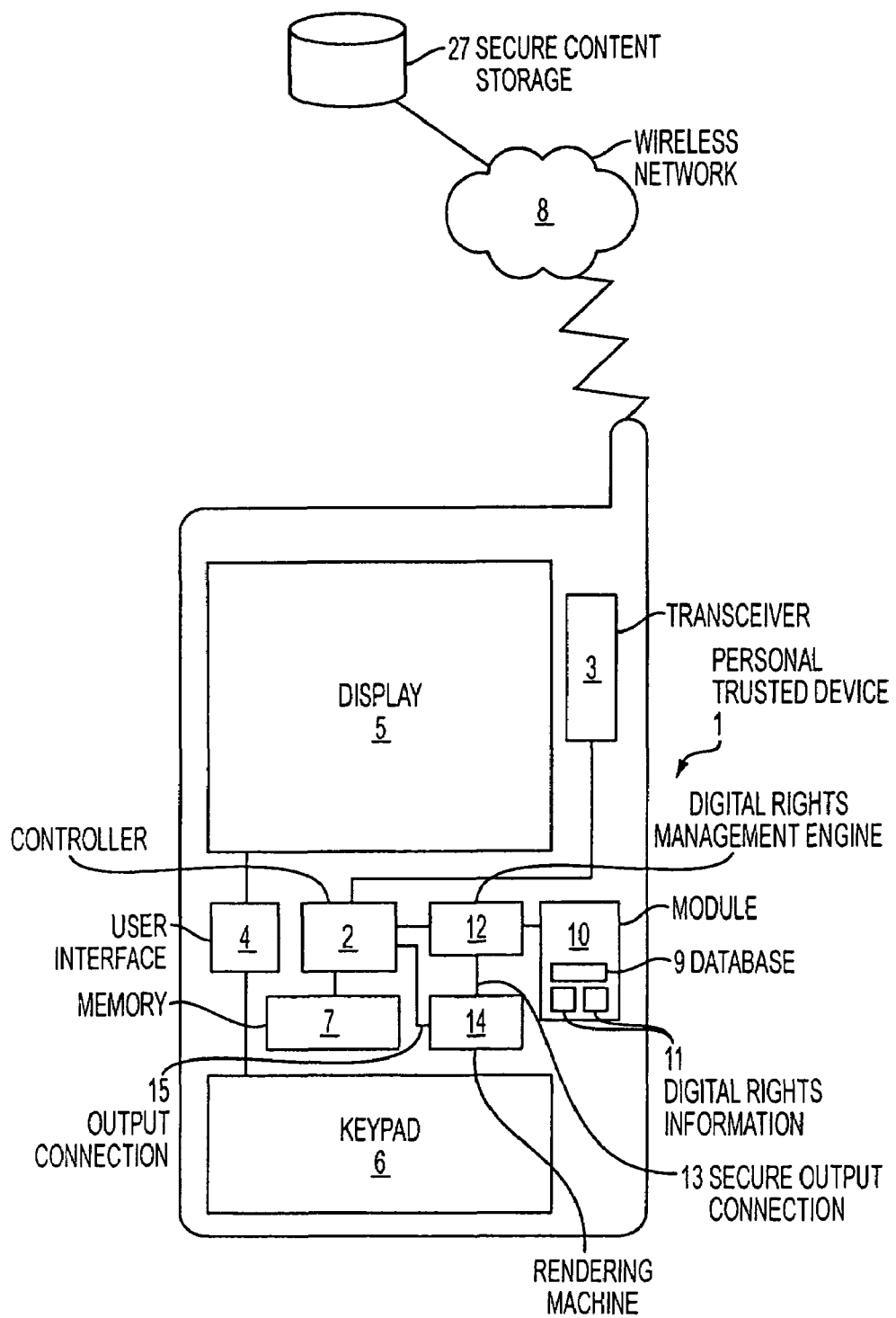
FIG. 1 is a block diagram illustrating a personal trusted device forming part of a system according to the present invention.

Referring to FIG. 1, there is shown a Personal Trusted Device (PTD) 1 which includes the functionality of a mobile terminal as is well known to those skilled in the art. Thus, the PTD 1 includes a controller 2 having connections to a transceiver 3, a user interface 4, having further connections to a display 5 and keypad 6, and a memory 7, the operation of which, in relation to a wireless network 8, are well understood by those skilled in the art.

In addition to the known functionality of a mobile terminal, the PTD 1 also includes a protected database 9 within a tamperproof module 10. As will be described in more detail below, the database 9 facilitates the storage of digital rights information or vouchers 11. The vouchers relate to content held in secure storage. Access to the database 9 is restricted to a digital rights management engine 12, which also interfaces with the controller 2. A secure output connection 13 from the digital rights management engine 12 is provided to a rendering machine 14 having an output connection 15 to the controller 2.

Figure 2:
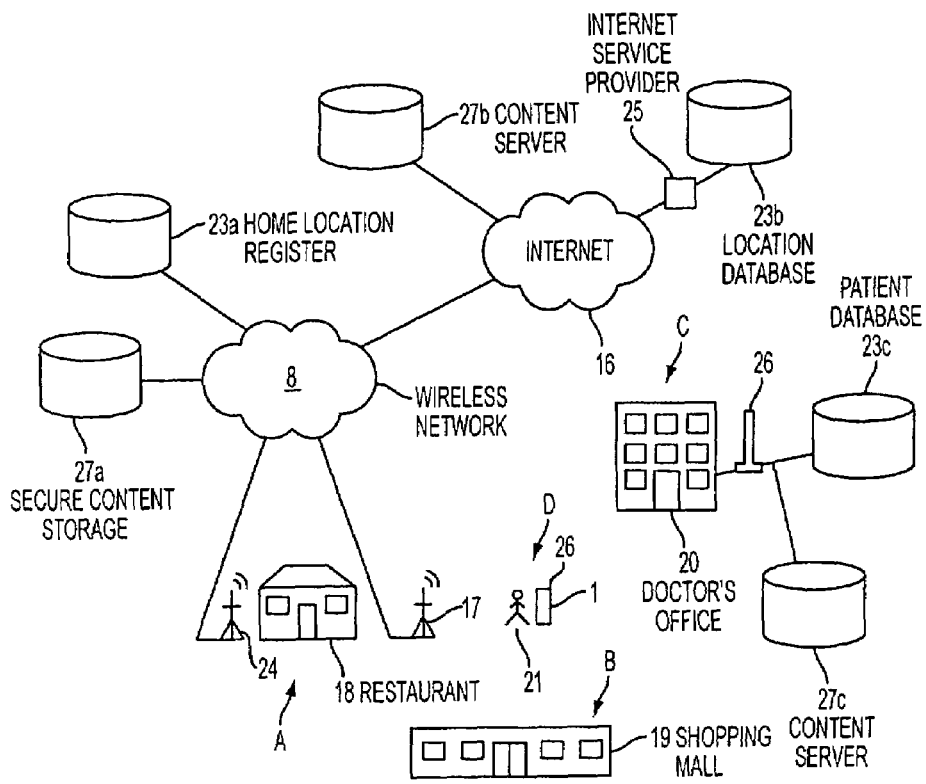
FIG. 2 is a schematic diagram illustrating a number of embodiments the system of FIG. 1.

Referring to FIG. 2, within the coverage area of the network 8 there are a plurality of so-called hotspots A, B C and D served by at least one base station 17. Of these hotspots A and B are co-located with a fast-food restaurant 18 and shopping mall 19 respectively, whilst C and D correspond to the location of a doctor's surgery 20 and her patient 21, respectively. The physical location of each hotspot is defined in suitable terms and may be held in an appropriate database 23 of which there may be more than one. Thus, the fast-food restaurant 18 includes a picocellular base station 24 providing coverage to the immediate surroundings, namely the interior of the restaurant 18. The network address of the base station 24 is held in a location database or Home Location Register (HLR) 23a forming an element of the network 8. In the case of the shopping mall 19, the geographical co-ordinates of the mall 19 are stored in a location database 23b connected to the Internet 16 and maintained by an Internet Service Provider (ISP) 25. The doctors surgery 20 includes a Low Power Radio Frequency (LPRF) access point 26, connected to a patient database 23c forming part of a surgery management system. The patient's 21 location is determined by a PTD 1 under the control of and in the possession of the patient 21, which PTD 1 further includes LPRF connectivity 26.

Figure 3:
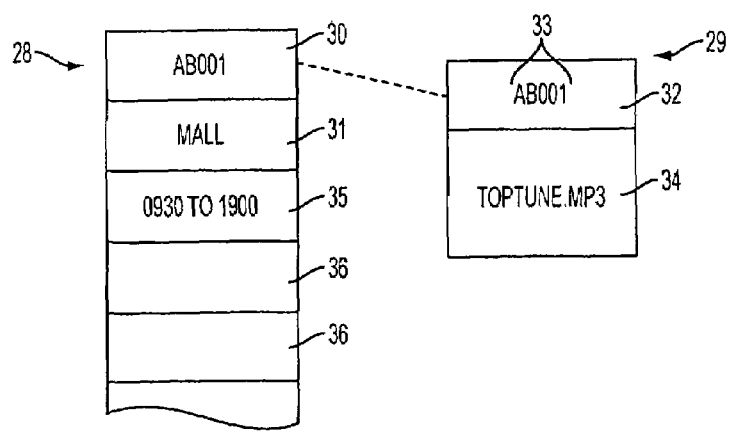
FIG. 3 is schematic diagram illustrating the data structure utilized in the system of FIG. 1.

Secure content storage 27 is provided in a plurality of appropriate locations. Thus, medical records may be stored securely on a content server 27c forming part of the surgery management system. Other content may be stored within a secure content server 27a on the network 8 or even on a secure content server 27b connected directly to the Internet 16. With reference to FIG. 3, within the secure content storage 27 a record 28 exists for each content item 29. In addition to a field 30 identifying the corresponding content item 29, the record 28 includes a field 31 identifying a set of locations or a pointer to an external location database holding location information at which the content 29, to which the record relates, may be rendered. Typically, the content 29 comprises a header portion 32 including data 33 to which the identifying field 30 of the record 28 points and a payload portion 34. Optionally, the record 28 includes a further field 35 indicating at what times and/or for how long the content 29 to which it relates may be rendered. Further fields 36 containing data addressing the needs of local legislation, such as age restrictions and the like, may also be provided. In a non-illustrated embodiment, rather than provide a separate record for each item of content, metadata associated with the content itself contains the restrictions, if any, imposed on rendering thereof.

Referring particularly to FIGS. 1 and 3, a user downloads or otherwise obtains a voucher 11 pertaining to content 29 which the purchaser may subsequently wish to render on PTD 1. Thus, in response to a request generated via the UI 4 of the PTD and passed by the controller 2 to the digital rights management engine 12, the engine 12 obtains a URL from the voucher 11. The URL provides an address of a secure content server 27 holding the content 29 to which the voucher 11 pertains. The controller 2 having first established a communications channel over the network 8, passes the request to the secure content server 27 together with data indicative of whether the PTD 1 is capable of providing trusted information identifying its physical location.

The server 27 receives the request and commences a handshaking process with the engine 12 contained within the PTD 1. The engine 12 utilizes the Public Key Infrastructure (PKI) including those elements held within the voucher 11, namely private keys, to authenticate the voucher 11 and hence the request. If the server is unable to authenticate the voucher 11 then the session is terminated.

Following authentication of the voucher 11, the secure content server 27 seeks to validate the conditions for delivery of the content 29 to the PTD 1 for rendering. The server 27 determines from data provided with the request whether the PTD 1 is capable of providing trusted location information. The server then accesses the record 28 corresponding to the content 29 to be rendered and determines firstly, what limitation if any is placed on a rendering location for the content 29. In the event that such a limitation exists, the server 27 field determines in what terms the limitation is defined. Thus, the limitation could be defined in relation to a network, elements of a network, geographical co-ordinates or proximity to another device, for example. Depending on the nature of the location defined in the field 31, the server 27 will adopt a different approach to determining the location of the PTD 1. Clearly, if the location is defined in terms of geographical co-ordinates, then a PTD 1 with the capability to provide trusted location information can be interrogated by the server 27 and geographical co-ordinates provided thereto. If no such facility exists or the facility is unavailable, perhaps the PTD 1 is within a building or other structure, then a network 8 based technique such as base station triangulation may be used to attempt to locate the PTD 1.

Where the location is defined by reference to the network 8 architecture with which a PTD 1 is associated, such as by proximity to a particular base station, then the server 27 will request an indication from a HLR of the network 8 of the base station through which the PTD 1 is currently accessing the network 8. In the event that the base station presently serving the PTD 1 corresponds to that defined in the record, then rendering of the corresponding content will be allowed, otherwise the session will be terminated.

In the circumstances where the location restriction is defined by an IP address of an access point, such as a LPRF access point or indeed another PTD, then at least two options exist for determining whether the PTD 1 is in proximity to the access point. In a first alternative, the server 27 contacts the access point and requests location information which it then compares with location information determined for the PTD 1. In a second alternative, the server 27 requests the PTD to authenticate itself to the access point and to provide evidence of the authentication such that content 29 may then be freely rendered.

In any event, the continued rendering of content 29 is contingent on the restrictions placed in the record file 28 being observed. Thus, the server 27 is obliged to remain satisfied that the conditions for rendering the content 29 remain met. This may not require a full authentication of the PTD 1 but rather only a check to the extent necessary as set by the record 28. Thus, the server 27 will need to repeat at predetermined intervals the process of identifying the location of the PTD 1, for example. To the extent that such information is provided by the PTD 1 itself, in the case of trusted location information, for example, then the digital rights management engine 12 will take part in the process necessary for continued rendering 29 of the content 29. Clearly, once the conditions fail to be met, rendering of the content will be terminated.

The above-described embodiment may be still further understood by reference to the following:

With reference to FIG. 2 and hotspot A, in particular, a user of a PTD 1, receives a voucher 11 as part of a promotional exercise carried out by the owner of the fast-food restaurant 18 in conjunction with the operator of the network 8 to which the PTD belongs. The voucher 11 entitles the user to render content 29 in the form of a selection of audio tracks from a recently released album. The voucher 11 is delivered to the PTD 1 by infrared or other suitable point to point connection by the point of sale (POS) equipment (not shown) of the restaurant 18 following the purchase of a pre-determined meal. However, the content record 28 associated with the content 29 held on the secure server 27a under the control of the network 8, includes a location restriction field 31 which permits rendering only within the confines of the restaurant. The restriction is defined in terms of a pico-cell within the network 8 which contains the restaurant 18. As the promotion is for a limited period, the content record also contains a field 35 indicating the period during which rendering may take place at the specified location. In addition to the voucher 11, the user receives a separate notification to her PTD 1 of the terms of the license.

The user is able, having purchased the meal to take a seat within the restaurant 13 and request via the UI 4, the content 29 identified in the voucher 11. Accordingly, in response to the request generated via the UI 4 of PTD 1 and passed by the controller 2 to the digital rights management engine 12, the engine 12 obtains a URL from the voucher 11. The URL provides an address of the secure content server 27a holding the content 29 to which the voucher 11 pertains, namely the selection of audio tracks from a recently released album. The controller 2 having first established a communications channel over the network 8, passes the request to the secure content server 27a together with data indicative of whether the PTD 1 is capable of providing trusted information identifying its physical location.

The server 27a receives the request and commences a handshaking process with the engine 12 contained within the PTD 1. The engine 12 utilizes the Public Key Infrastructure (PKI) including those elements held within the voucher 11, namely private keys, to authenticate the voucher 11 and hence the request. If the server 27a is unable to authenticate the voucher 11 then the session is terminated.

Following authentication of the voucher 11, the secure content server 27a seeks to validate the conditions for delivery of the content 29 to the PTD 1 for rendering. The server 27a determines from data provided with the request whether the PTD 1 is capable of providing trusted location information. The server then accesses the record 28 corresponding to the content 29 to be rendered and determines firstly, what limitation if any is placed on a rendering location for the content 29. On finding that the limitation relates to an element of the network 8 namely a base station 17, the server 27 requests an indication from an HLR 23a of the network 8 of the base station through which the PTD 1 is currently accessing the network 8. In the event that the base station 17 presently serving the PTD 1 corresponds to that defined in the record 28, then rendering of the corresponding content will be allowed, otherwise the session will be terminated.

Subject to any other restrictions on the rendering of the content 29 set out in the record 28, the digital rights management engine 12 of the PTD 1 receives the content 29 which is decrypted thereby and then rendered by the rendering machine 14. An audio output jack on the PTD (not shown) permits the connection of headphones to the device 1 such that the user can enjoy the rendered audio content 29 whilst information relating to the content 29 selected by the user may be presented on the display 5. Should the user leave the confines of the restaurant 18 and thus the scope of the license conferred by the voucher 11, then as has been previously described the server will stop the rendering of that content.

With reference to FIG. 2 and hotspot B, in particular, a user of a PTD 1 is pushed details of a sale event at the shopping mall 19. Included with the details is a voucher 11 which entitles the user to render content 29 in the form of various multimedia promotional presentations relating to products available from outlets within the mall 19. However, the content record 28 associated with the content 29 held on the secure server 27a includes a location restriction field 31 pointing to a location database 23b operated by the ISP 25, the database permitting rendering only within the confines of the mall 19. The restriction is defined in terms of a geographical location in the form of the co-ordinates of the mall 19. As the promotion is for a limited period, the content record 28 also contains a field 35 indicating the period during which rendering may take place. In addition to the voucher 11, the user receives a separate notification to her PTD 1 of the terms of the license.

Having received the voucher 11, the user may choose to travel to the mall 19. On arrival at the mall 19, the user attempts to render the content via the UI 4 and thus a request is passed by the controller 2 to the digital rights management engine 12. The engine 12 obtains a URL from the voucher 11. The URL provides an address of the secure content server 27b holding the content 29 to which the voucher 11 pertains, namely various multimedia promotional presentations relating to products available from outlets within the mall 19. The controller 2 having first established a communications channel over the network 8 to the Internet 16, passes the request to the secure content server 27b together with data indicative of whether the PTD 1 is capable of providing trusted information identifying its physical location.

The server 27b receives the request and commences a handshaking process with the engine 12 contained within the PTD 1. The engine 12 utilizes the Public Key Infrastructure (PKI) including those elements held within the voucher 11, namely private keys, to authenticate the voucher 11 and hence the request. If the server is unable to authenticate the voucher 11 then the session is terminated.

Following authentication of the voucher 11, the secure content server 27b seeks to validate the conditions for delivery of the content 29 to the PTD 1 for rendering. The server 27b determines from data provided with the request whether the PTD 1 is capable of providing trusted location information. The server then accesses the record 28 corresponding to the content 29 to be rendered and determines firstly, what limitation if any is placed on a rendering location for the content 29.

On finding that the limitation relates to a location defined by geographical co-ordinates, the server 27b checks whether the PTD 1 is capable of providing trusted location information. If so, a request is issued to the PTD 1 by the server 27b for its co-ordinates. The PTD 1 responds by passing the information on its present location back to the server 27b. Assuming the PTD 1 is appropriately located the server 27b releases the content for rendering by the PTD 1.

If the PTD 1 is not capable of providing trusted location information, then the server 27b must instead form and send a request to the network 8 with which the PTD 1 is associated to provide location information in respect of that PTD 1. How the network 8 determines the location of the PTD 1 in response to such a request will depend on the particular network solution adopted to positioning. Thus, the network 8 may utilize base station triangulation although other suitable techniques will be apparent to those skilled in the art. Once provided and satisfied with the location information relating to the PTD by the network 8, the server 27b is free to release the content for rendering by the PTD 1.

Subject to any other restrictions on the rendering of the content 29 set out in the record 28, the digital rights management engine 12 of the PTD 1 receives the content 29 which is decrypted thereby and then rendered by the rendering machine 14. An audio output jack on the PTD (not shown) permits the connection of headphones to the device such that the user can enjoy the rendered audio content of the presentation whilst video content is presented on the display 5. Should the user leave the confines of the mall and thus the scope of the license conferred by the voucher 11, then as has been previously described the server 27b will stop the rendering of that content 29.

With reference to FIG. 2 and hotspots C and D, in particular, a doctor may wish to view confidential medical records relating to a patient under care. The records are located on a secure content server 27c housed within the surgery 20. A storage device 23c holds details relating to the patient location and more particularly, public keys with which an authenticated session may be established with the patients PTD 1.

In accordance with local legislation, the doctor is permitted access to the medical records of the patient within only the confines of surgery 20 or in the presence of patient 21. In order to comply with this requirement, a record 28 associated with the content 29, namely the medical records of her patient 21, indicates that the content 29 may be rendered in the surgery 20 or in the close proximity D to patient 21. This indication is defined in the first instance by reference to the LPRF access point 26 within the surgery 20 and in the second instance by having the doctor's PTD 1 authenticate itself to the patients PTD 1 by virtue of a short range point to point communication channel, such as LPRF or the like.

The doctors PTD 1 is pre-loaded with vouchers 11 relating to those patients under care. In those circumstances where the doctor is present within the surgery 20 and having selected via the UI 4 a particular patient 21 whose records to be viewed, the request is passed by the controller 2 to the digital rights management engine 12. The engine 12 obtains a URL from the voucher 11. The URL provides an address of the secure content server 27a holding the content 29 to which the voucher 11 pertains, namely the medical records of the patient 21. The controller 2 having first established a communications channel over the network 8, passes the request to the secure content server 27c, together with data indicative of whether the PTD 1 is capable of providing trusted information identifying its physical location, in this case its proximity to a patient.

The server 27c receives the request and commences a handshaking process with the engine 12 contained within the PTD 1. The engine 12 utilizes the Public Key Infrastructure (PKI) including those elements held within the voucher 11, namely private keys, to authenticate the voucher 11 and hence the request. If the server 27c is unable to authenticate the voucher 11 then the session is terminated.

Following authentication of the voucher 11, the secure content server 27c seeks to validate the conditions for delivery of the content 29 to the PTD 1 for rendering. Thus, the server 27 accesses the record 28 corresponding to the content 29 to be rendered and determines firstly, what limitation if any is placed on a rendering location for the content 29, namely that the PTD 1 is located in the surgery or in proximity to the patient's PTD 1'.

In this case, the server 27c forms part of the surgery management system which includes a LPRF access point 26. Thus, the server 27c is able to query directly the LPRF access point 26 to determine whether the PTD 1 is present within the surgery 20. On finding that the doctor's PTD 1 is within the surgery 20, the content 29 is delivered for rendering to the PTD 1. To provide additional security, the content 29 may be delivered over the LPRF access point 26 rather than using the network 8. Indeed the whole process of seeking access to the content 29 by the PTD 1 may, instead of utilizing the network 8, be carried out via the LPRF access point 26. Subject to any other restrictions on the rendering of the content 29 set out in the record 28, the digital rights management engine 12 of the PTD 1 receives the content 29 which is decrypted thereby and then rendered by the rendering machine 14. As before, should the doctor leave the confines of the surgery 20 and thus the scope of the license conferred by the voucher 11, then as has been previously described, the server 27c will stop the rendering of that content 29 on the PTD 1.

In the event that the doctor is with the patient 21 outside of the surgery 20, then the request for rendered content 29 namely the medical records of the patient 21 is passed by the controller 2 to the digital rights management engine 12. The engine 12 obtains a URL from the voucher 11. The URL provides an address of the secure content server 27 holding the content 29 to which the voucher 11 pertains, namely the medical records of the patient 21. The controller 2 having first established a communications channel over the network 8, passes the request to the secure content server 27c together with data indicative of whether the PTD 1 is capable of providing trusted information identifying its physical location, in this case its proximity to a patient.

The server 27c receives the request and commences a handshaking process with the engine 12 contained within the PTD 1. The engine 12 utilizes the Public Key Infrastructure (PKI) including those elements held within the voucher 11, namely private keys, to authenticate the voucher 11 and hence the request. If the server 27c is unable to authenticate the voucher 11 then the session is terminated.

Following authentication of the voucher 11, the secure content server 27c seeks to validate the conditions for delivery of the content 29 to the PTD 1 for rendering. Thus, the server 27 accesses the record 28 corresponding to the content 29 to be rendered and determines firstly, what limitation if any is placed on a rendering location for the content 29, namely that the PTD 1 is located in the surgery 20 or in proximity to the patient's PTD 1'.

As has been set out above, the server 27c forms part of the surgery management system which includes the LPRF access point 26. Thus, the server 27c is able to query directly the LPRF access point 26 to determine whether the PTD 1 is present within the surgery 20. On finding that the doctor's PTD 1 is not within the surgery 20, the server 27c issues a request over the network 8 to the doctor's PTD 1 to authenticate itself to the patients PTD 1'. On receiving the request, the digital rights management engine 12 initiates a suitable authentication process over a LPRF connection (not shown) to the patient's PTD 1'. Successful completion of the process results in an appropriate response being made to the server 27c. Clearly, the response to the server 27c should include elements of the PKI which will assure the server 27c that the doctor's PTD 1 is properly authenticated and therefore in proximity to the patients device 1'. Subsequently, and subject to any other restrictions on the rendering of the content 29 set out in the record 28, the content 29 is delivered over the network 8 to the doctor's PTD 1 for rendering thereby. The digital rights management engine 12 of the PTD 1 receives the content 29 which is decrypted thereby and then rendered by the rendering machine 14 for presentation by a suitable element such as the displays. Should the doctor leave the proximity of the patient's PTD 1' and thus the scope of the license conferred by the voucher 11, then as has been previously described, the updates of the location of the PTD 1 demanded by the server 27c will reveal this event and the server 27c will terminate the rendering of that content.

It will be readily apparent from the above that many of the processes involved in rendering content on the PTD 1 depend on the provision of confidential or personal information particularly relating to location finding. Thus, various forms of encryption may put in place to protect both information and channels of communication over which such information is transferred.

What is claimed is:

1. A method for delivering content to a mobile terminal, comprising:
   storing content at a server for delivery to at least one mobile terminal, the content associated with a content record comprising location restriction information for the content;
   receiving a request for the content by the server from a mobile terminal;
   receiving location information for the mobile terminal by the server;
   determining that the mobile terminal is eligible to receive and render the content by comparing the location information for the mobile terminal with the location restriction information for the content;
   transmitting the content from the server to the mobile terminal based on the determination;
   receiving updated location information for the mobile terminal by the server;
   comparing the updated location information to the location restriction information for the content; and
   based on the comparison,
     preventing content rendering on the mobile terminal if the updated location information for the mobile terminal does not correspond to the location restriction information, and
     permitting content rendering of the content on the mobile terminal if the updated location information for the mobile terminal corresponds to the location restriction information.

2. The method of claim 1, further comprising the step of storing the content record in a database on the server.

3. The method of claim 1, wherein the step of transmitting the content to the mobile terminal comprises transmitting said content over a wireless network.

4. The method of claim 1, wherein the transmitted content includes the location restriction information as metadata.

5. The method of claim 1, wherein the location restriction information corresponds to one of a shopping facility, a restaurant, and an office building.

6. The method of claim 1, wherein the step of transmitting the content to the mobile terminal comprises transmitting said content via a low power radio frequency (LPRF) access point.

7. The method of claim 1, further comprising the step of encrypting the content before transmitting to the terminal.

8. The method of claim 1, wherein at least one of the receiving location information and the receiving updated location information comprises receiving mobile terminal location information from an access point in proximity to the mobile terminal.

9. The method of claim 1, wherein at least one of the receiving location information and the receiving updated location information comprises receiving from the mobile terminal information authenticated by an access point in proximity to the mobile terminal.

10. The method of claim 1, wherein the step of receiving the request from the mobile terminal comprises receiving said request over a wireless network.

11. The method of claim 1, further comprising providing a voucher to the mobile terminal, the voucher including digital rights information and a uniform resource locator (URL) corresponding to the content on the server.

12. The method of claim 11, wherein the step of receiving the request from the mobile terminal comprises:
receiving a copy of the voucher; and
authenticating the request based on the URL and the digital rights information in the voucher.

13. A secure content server comprising:
a processor controlling at least some operations of the server;
a memory storing computer executable instructions that, when executed by the processor, cause the server to perform a method comprising steps of:
storing content at a server for delivery to at least one mobile terminal, the content associated with a content record comprising location restriction information for the content;
receiving a request for the content by the server from a mobile terminal;
receiving location information for the mobile terminal by the server;
determining that the mobile terminal is eligible to receive and render the content by comparing the location information for the mobile terminal with the location restriction information for the content;
transmitting the content from the server to the mobile terminal based on the determination;
receiving updated location information for the mobile terminal by the server;
comparing the updated location information to the location restriction information for the content; and
based on the comparison,
preventing content rendering on the mobile terminal if the updated location information for the mobile terminal does not correspond to the location restriction information, and
permitting content rendering of the content on the mobile terminal if the updated location information for the mobile terminal corresponds to the location restriction information.

14. The secure content server of claim 13, the method further comprising the step of storing the content record in a database on the server.

15. The secure content server of claim 13, wherein the step of transmitting the content to the mobile terminal comprises transmitting said content over a wireless network.

16. The secure content server of claim 13, wherein the transmitted content includes the location restriction information as metadata.

17. The secure content server of claim 13, wherein the location restriction information corresponds to one of a shopping facility, a restaurant, and an office building.

18. The secure content server of claim 13, wherein the step of transmitting the content to the mobile terminal comprises transmitting said content via a low power radio frequency (LPRF) access point.

19. The secure content server of claim 13, the method further comprising the step of encrypting the content before transmitting to the terminal.

20. The secure content server of claim 13, wherein at least one of the receiving location information and the receiving updated location information comprises receiving mobile terminal location information from an access point in proximity to the mobile terminal.

21. The secure content server of claim 13, wherein at least one of the receiving location information and the receiving updated location information comprises receiving from the mobile terminal information authenticated by an access point in proximity to the mobile terminal.

22. The secure content server of claim 13, wherein the step of receiving the request from the mobile terminal comprises receiving said request over a wireless network.

23. The secure content server of claim 13, the method further comprising the step of providing a voucher to the mobile terminal, the voucher including digital rights information and a uniform resource locator (URL) corresponding to the content on the server.

24. The secure content server of claim 23, wherein the step of receiving the request from the mobile terminal comprises:
receiving a copy of the voucher; and
authenticating the request based on the URL and the digital rights information in the voucher.

25. A computer program stored on a storage medium for transmitting content to a mobile terminal, said computer program when executed on a processor causes a computer to perform a method comprising steps of:
storing content at a server for delivery to at least one mobile terminal, the content associated with a content record comprising location restriction information for the content;
receiving a request for the content by the server from a mobile terminal;
receiving location information for the mobile terminal by the server;
determining that the mobile terminal is eligible to receive and render the content by comparing the location information for the mobile terminal with the location restriction information for the content;
transmitting the content from the server to the mobile terminal based on the determination;
receiving updated location information for the mobile terminal by the server;
comparing the updated location information to the location restriction information for the content; and
based on the comparison,
preventing content rendering of the content on the mobile terminal if the updated location information for the mobile terminal does not correspond to the location restriction information, and
permitting content the continued rendering of the content on the mobile terminal if the updated location information for the mobile terminal corresponds to the location restriction information.

26. The computer program of claim 25, the method further comprising the step of storing the content record in a database on the server.

27. The computer program of claim 25, wherein the step of transmitting the content to the mobile terminal comprises transmitting said content over a wireless network.

28. The computer program of claim 25, wherein the transmitted content includes the location restriction information as metadata.

29. The computer program of claim 25, wherein the location restriction information corresponds to one of a shopping facility, a restaurant, and an office building.

30. The computer program of claim 25, wherein the step of transmitting the content to the mobile terminal comprises transmitting said content via a low power radio frequency (LPRF) access point.

31. The computer program of claim 25, further comprising the step of encrypting the content before transmitting to the terminal.

32. The computer program of claim 25, wherein at least one of the receiving location information and the receiving updated location information comprises receiving mobile terminal location information from an access point in proximity to the mobile terminal.

33. The computer program of claim 25, wherein at least one of the receiving location information and the receiving updated location information comprises receiving from the mobile terminal information authenticated by an access point in proximity to the mobile terminal.

34. The computer program of claim 25, wherein the step of receiving the request from the mobile terminal comprises receiving said request over a wireless network.

35. The computer program of claim 25, further comprising the step of providing a voucher to the mobile terminal, the voucher including digital rights information and a uniform resource locator (URL) corresponding to the content on the server.

36. The computer program of claim 35, wherein the step of receiving the request from the mobile terminal comprises:
  receiving a copy of the voucher; and
  authenticating the request based on the URL and the digital rights information in the voucher.

37. A content delivery system for securely transmitting content to a terminal, said system comprising:
  means for storing content at a server for delivery to at least one mobile terminal, the content associated with a content record comprising location restriction information for the content;
  means for receiving a request for the content by the server from a mobile terminal;
  means for receiving location information for the mobile terminal by the server;
  means for determining that the mobile terminal is eligible to receive and render the content by comparing the location information for the mobile terminal with the location restriction information for the content;
  means for transmitting the content from the server to the mobile terminal based on the determination;
  means for receiving updated location information for the mobile terminal by the server;
  means for comparing the updated location information to the location restriction information for the content; and
  means for preventing content rendering on the mobile terminal, if the updated location information for the mobile terminal does not correspond to the location restriction information; and,
  means for permitting content rendering of the content on the mobile terminal if the updated location information for the mobile terminal does correspond to the location restriction information.

* * * * *